F. E. PETERSON.
DISPLAY STAND.
APPLICATION FILED FEB. 6, 1911.
1,035,100.
Patented Aug. 6, 1912.
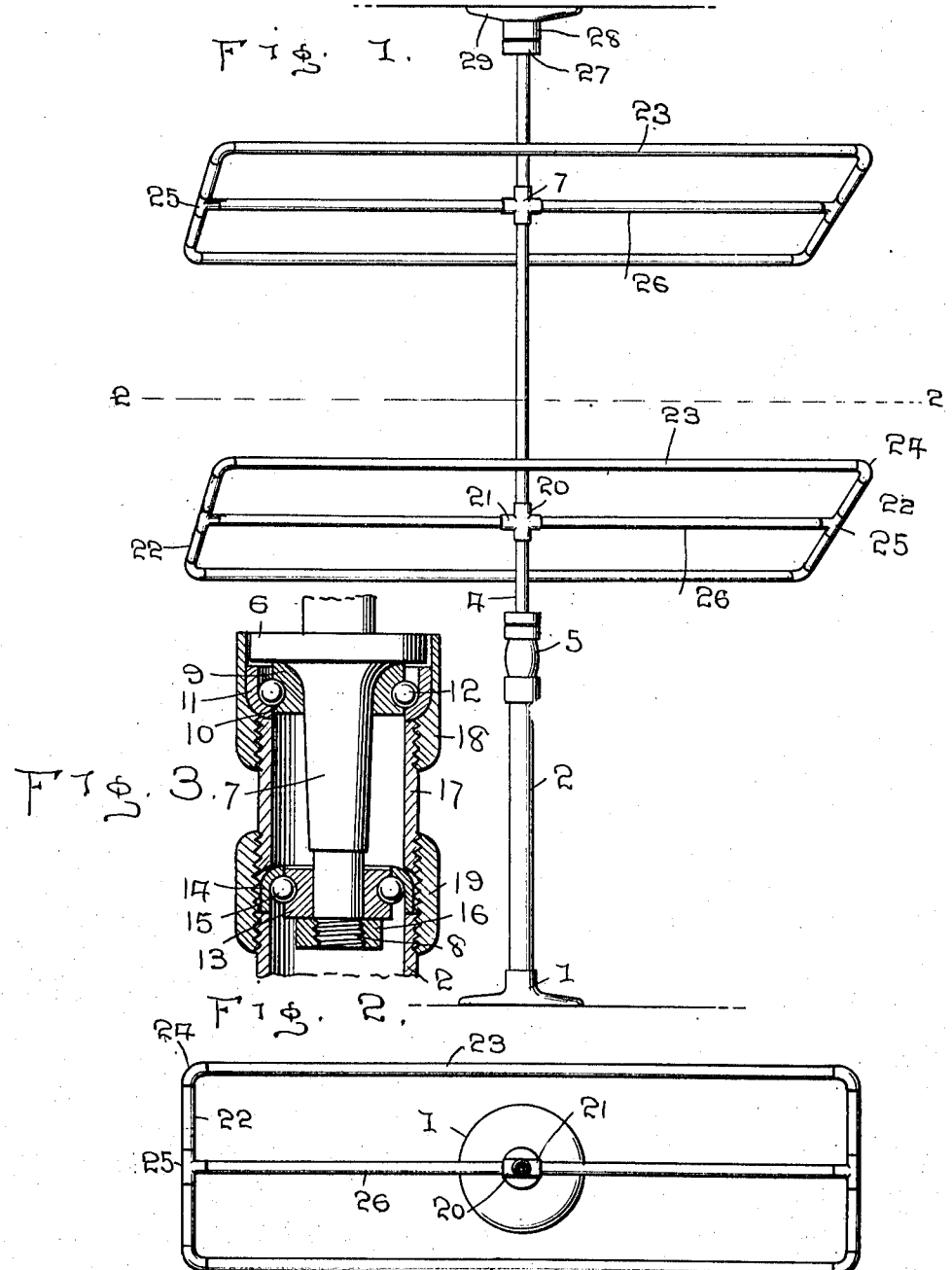
WITNESSES:
INVENTOR
F. E. Peterson
BY
Attorneys

UNITED STATES PATENT OFFICE.

FRANK E. PETERSON, OF PRINCETON, ILLINOIS.

DISPLAY-STAND.

1,035,100.  Specification of Letters Patent.  Patented Aug. 6, 1912.

Application filed February 6, 1911. Serial No. 606,915.

*To all whom it may concern:*

Be it known that I, FRANK E. PETERSON, a citizen of the United States, residing at Princeton, in the county of Bureau and State of Illinois, have invented certain new and useful Improvements in Display-Stands; and I do hereby declare the following to be a full, clear, and exact description of the invention, such as will enable others skilled in the art to which it appertains to make and use the same.

My invention relates to new and useful improvements in display stands and the object of my invention is to provide a stand which may be very cheaply constructed and which will be very durable in use.

A further object of my invention is to provide a stand which may be rotated to bring the articles displayed thereon successively to view.

A still further object is to provide suitable anti-friction bearings for said stand whereby the same may be easily rotated.

Other objects and advantages of my invention will be hereinafter more clearly set forth.

In the accompanying drawing which is made a part of this application, I have shown the preferred form which my invention may take.

In said drawing, Figure 1 is a side elevation of my improved form of stand. Fig. 2 is a horizontal sectional view through the stand as seen on line 2—2, Fig. 1, and, Fig. 3 is a longitudinal sectional view through the anti-friction coupling and in connection with my stand.

Referring to the drawings in which similar reference numerals designate corresponding parts throughout the several views, 1 is the base of the stand which may be of any preferred size and which is preferably secured to the floor. The base 1 is preferably provided with an upwardly extending standard 2 which may be formed integral therewith or be secured thereto. The standard 2 is preferably formed from a pipe section and has its upper end exteriorly screw-threaded. A rod 4 is adapted to be rotatably secured to the upper end of the standard and in order to reduce friction to a minimum, I provide an anti-friction coupling 5. The lower end of the rod 4 is provided with an annular cylindrical collar 6 and with a tapering spindle 7 extending beyond said collar, the end of said spindle being screw-threaded, as shown at 8. A bearing ring 9 provided with an annular bearing groove 10 in its periphery, is disposed on said spindle adjacent the collar and is adapted to coöperate with a bearing cup 11 having a coacting bearing race, suitable anti-friction devices, such as balls 12, being interposed between said ring and cup. The lower end of the spindle 7 adjacent the threaded portion 8, is also provided with a bearing ring 13 similar to the ring 9 which coöperates with the bearing cup 14 similar in form to the bearing cup 11 but reversed in position, balls 15 being interposed between said cup and ring. The ring 13 is held in place upon the spindle by means of a nut 16 which engages the threaded end 8 of the spindle. In order to properly support the upper bearing and also to maintain the bearing cups 11 and 14 in spaced relation, I provide a sleeve 17 between said cups which is enlarged at its upper end or provided with a ring 18, which is secured thereto. In the drawing, I have shown the use of the ring 18 which is placed in threaded engagement with the sleeve section 17, the upper portion of the ring 18 being recessed to receive the bearing cup 11. The sleeve 17 and the standard 2 are preferably of the same diameter and the bearing cup 14 is of larger diameter so as to extend therebetween and rest upon the ends thereof.

The lower end of the pipe section 17 is screw-threaded and an interiorly screw-threaded sleeve 19 is adapted to be turned in engagement with said section and with the upper end of the standard 2 so as to secure the same together.

Secured to the rod 4 are any number of members 20, to which display racks are secured. The members 20 are provided with oppositely extending nipples 21 for a purpose hereinafter more clearly set forth.

The display racks are preferably formed with end members 22 and with side members 23. The ends of said members are connected together by means of elbow joints 24. Interposed in the length of each of the end members 22, is a T-joint 25. A rod 26 is connected to each of the T-joints and to one of the nipples 21 and said rods 26 form part of the rack and serve as supports for the entire rack. Members 22, 23 and 26 of the rack are formed of tubular sections.

The display racks are preferably formed oblong, as shown in Fig. 2, and with the rods 26 disposed longitudinally of the rack and rotatable in nipples 21 to permit of the adjustment of the racks to raise or lower either side member 23 as may be desirable to exhibit goods hanging on the racks.

When desired, the upper end of the rod 4 may be provided with a bearing cup 27 near its upper end adapted to coöperate with a suitable bearing cup 28 carried by a base plate 29 adapted to be secured to the ceiling of a room. Suitable anti-friction devices may be interposed between said cups.

When it is desired to continuously rotate the display racks, suitable gearing or a pulley may be secured to the rod 4 and connected to a source of power.

Any articles to be displayed are secured to or draped from any one or all of the members 22, 23 and 26, and it is only necessary to turn the rack around to get a good view of all the articles contained thereon.

It will be seen that I have provided a display rack which may be entirely constructed from tubular pipe sections and one therefore which may be readily and cheaply manufactured.

What I claim is:—

In a display stand, the combination with a vertically disposed rotatable rod provided with a fitting having oppositely extending horizontal nipples; of a rectangular rack surrounding the rod and fitting comprising side and end pieces, and horizontal members having their outer ends secured to the end pieces and their inner ends rotatably seated in the nipples.

In testimony whereof I have signed my name to this specification in the presence of two subscribing witnesses.

FRANK E. PETERSON.

Witnesses:
SELBY S. SMITH,
G. R. WADDELL.